(12) United States Patent
Kim et al.

(10) Patent No.: US 7,978,837 B2
(45) Date of Patent: Jul. 12, 2011

(54) METHOD AND APPARATUS FOR PROVIDING USER-ADAPTED SERVICE ENVIRONMENT

(75) Inventors: Eun-hyung Kim, Seongnam-si (KR); Sang-gon Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/412,894

(22) Filed: Apr. 28, 2006

(65) Prior Publication Data
US 2006/0248332 A1    Nov. 2, 2006

(30) Foreign Application Priority Data
Apr. 28, 2005    (KR) .................. 10-2005-0035607

(51) Int. Cl.
*H04M 3/42*    (2006.01)
(52) U.S. Cl. ................ 379/201.02; 379/201.01

(58) Field of Classification Search .......... 379/201.02, 379/245, 201.01, 207.13; 726/1
See application file for complete search history.

(56) References Cited

U.S. PATENT DOCUMENTS

| | | | |
|---|---|---|---|
| 2003/0002650 A1* | 1/2003 | Gruchala et al. | 379/245 |
| 2003/0120750 A1 | 6/2003 | Gaxiola et al. | |
| 2004/0146057 A1 | 7/2004 | Yi et al. | |
| 2004/0158823 A1 | 8/2004 | Saint-Hilaire et al. | |
| 2009/0007228 A1* | 1/2009 | Balay et al. | 726/1 |

FOREIGN PATENT DOCUMENTS

| | | |
|---|---|---|
| CN | 1503961 A | 6/2004 |
| KR | 10-2003-0058398 A | 7/2003 |
| KR | 10-2003-0062735 A | 7/2003 |

* cited by examiner

*Primary Examiner* — Thjuan K Addy
(74) *Attorney, Agent, or Firm* — Sughrue Mion, PLLC

(57) ABSTRACT

Provided are a method and apparatus for providing a user-adapted service environment. The method includes authenticating a user, transmitting first user identification information for identifying the authenticated user to a controlled device, receiving a user profile corresponding to the first user identification information from the controlled device, and configuring a service environment using the received user profile.

18 Claims, 12 Drawing Sheets

FIG. 6

| | | | user1 | |
|---|---|---|---|---|
| 610 | USER IDENTIFICATION INFORMATION | | | |
| 620 | BASIC UI TYPE INFORMATION | | | |
| 630 | HISTORY INFORMATION | CONTENT (632) | CONTENT 1 | TIMES OF USE:aa, USAGE DURATION:bb, RECENT DATE OF USE:xx-yy-zz |
| | | | CONTENT 2 | TIMES OF USE:cc, USAGE DURATION:dd, RECENT DATE OF USE:ss-rr-pp |
| | | | ... | ... |
| | | FUNCTION (634) | SLEEP RESERVATION | TIMES OF USE:cc, USAGE DURATION:dd, RECENT DATE OF USE:qq-rr-ss |
| | | | RECORDING | TIMES OF USE:ee, USAGE DURATION:ff, RECENT DATE OF USE:ll-mm-nn |
| | | | ... | ... |
| 640 | USE ENVIRONMENT SETTING INFORMATION | | SCREEN BRIGHTNESS | 20 |
| | | | VOLUME | 13 |
| | | | ... | ... |

TREE STRUCTURE

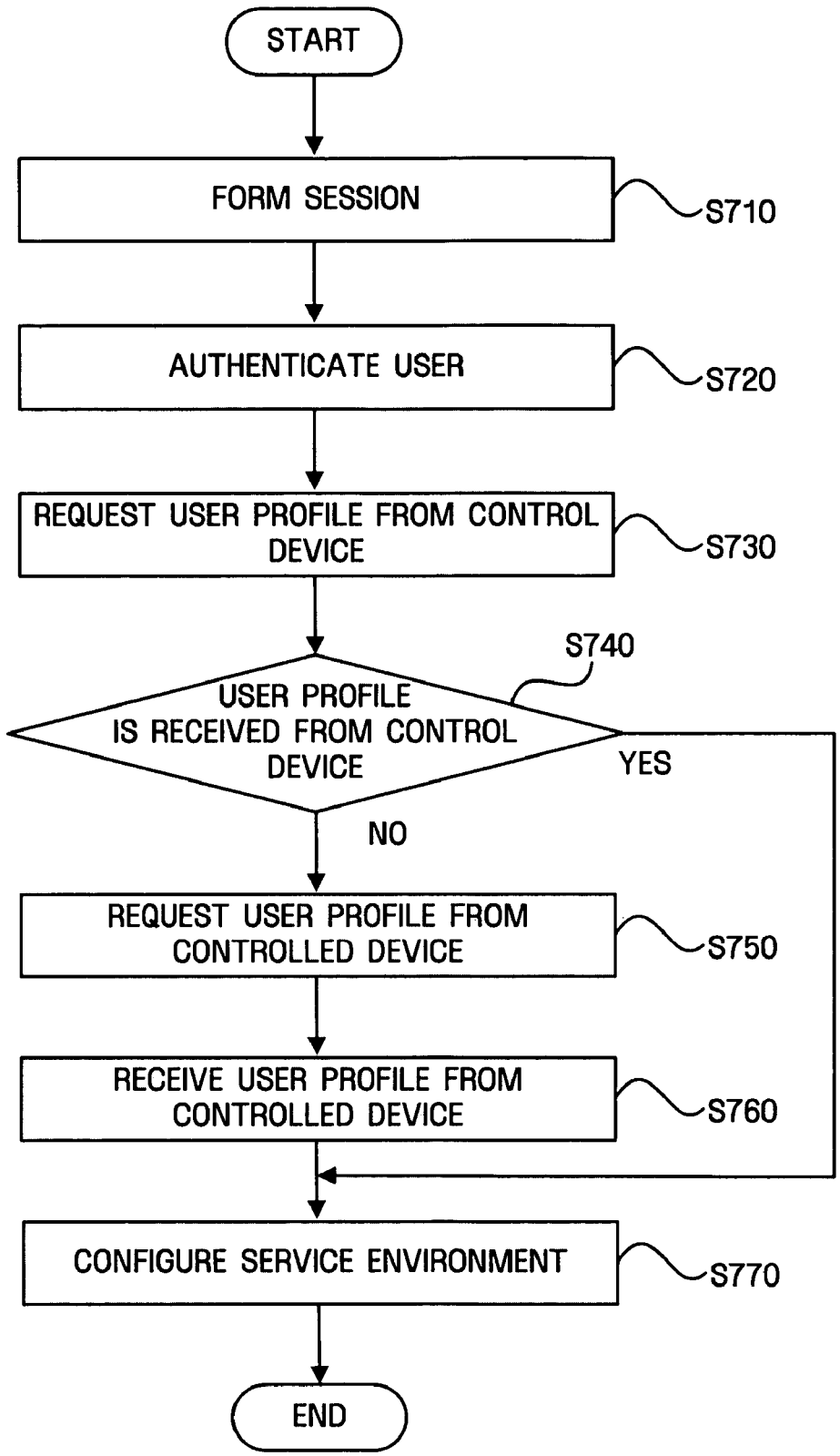

METHOD AND APPARATUS FOR PROVIDING USER-ADAPTED SERVICE ENVIRONMENT

CROSS-REFERENCE TO RELATED APPLICATION

This application claims priority from Korean Patent Application No. 10-2005-0035607 filed on Apr. 28, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to providing a service environment specialized for each user, and more particularly, to a method and apparatus for providing a user-adapted service environment by managing an authenticated user profile.

2. Description of the Related Art

Generally, a home network is implemented by a private network based on the Internet Protocol (IP). A variety of machines such as all types of personal computers (PC), intelligent devices, and wireless devices, which are used within a home, are connected and controlled through the home network based on a virtual common computing environment referred to as middleware.

Middleware connects various digital devices in peer-to-peer networks so that digital devices communicate with each other. Home Audio/Video Interoperability (HAVI), UPnP, Java intelligent network infrastructure (Jini), Home Wide Web (HWW), Open Services Gateway initiative (OSGi), etc., have been suggested as middleware.

Network devices included in a home network are classified as control devices which control other network devices, and controlled devices which provide predetermined service according to the control of the control device. If a home network is implemented through UPnP, network devices included in the home network are classified as a control point (CP) and a controlled device (CD).

Control devices and controlled devices use an IP address assigned by a dynamic host configuration protocol (hereinafter, referred to as "DHCP") server or selected by an automatic IP designating function (Auto IP) and are connected to one another through a Peer-to-Peer type network.

When a control point and a controlled device are activated in a home network, the controlled device transmits its device information and service information to the control point. Thus, the control point can recognize the function of the controlled device through the device information and the service information provided from the controlled device. Accordingly, a user can check a service list provided by the controlled device and use a service provided by the controlled device using the control point.

However, according to the related art, a control device provides a service list of a controlled device to a user by simply enumerating information transmitted from the controlled device. As a result, the user should search for a desired service whenever using the control point even if the desired service is a user's favorite service.

Moreover, according to the related art, a user should set his/her preferred environment values (e.g., screen brightness, volume, and screen aspect ratio) for using a device whenever using a service provided by a specific controlled device using a control point.

Korean Patent Publication No. 2003-62735 discloses a method for supplying user interface of a home network system, in which user-set items for controlling an operation of a home network device are extracted from a description file received from the home network device, a user interface (UI) table is formed by combining the extracted user-set items, and the user-set items of the UI table are displayed on a manipulation panel according to a user's key manipulation. In the disclosed technique, a script parser or an extensible markup language (XML) parser is not included, and thus, the user can easily receive information of home network devices using a remote control even in a display environment where a browser is not available. However, the disclosed technique does not provide a service environment specialized for each user, thereby requiring the user to always search for a desired service and set his/her preferred environment values.

SUMMARY OF THE INVENTION

An aspect of the present invention provides a method and apparatus for providing a user-customized service to a user using a service in a home network.

This and other aspects of the present invention will be described in or be apparent from the following description of the exemplary embodiments.

According to an aspect of the present invention, there is provided a method for providing a user-adapted service environment. The method includes authenticating a user, transmitting first user identification information for identifying the authenticated user to a controlled device, receiving a user profile corresponding to the first user identification information from the controlled device, and configuring a service environment using the received user profile.

According to another aspect of the present invention, there is provided a method for providing a user-adapted service environment, the method including receiving user identification information from a control device, searching for a user profile corresponding to the received user identification information, transmitting the found user profile to the control device when the user profile is found, and creating a new user profile corresponding to the user identification information if the user profile is not found and transmitting the new user profile to the control device.

According to still another aspect of the present invention, there is provided a network device including an authentication module which authenticates a user, a network interface module which transmits first user identification information for identifying the authenticated user to a controlled device and receives a user profile corresponding to the first user identification information from the controlled device, and a service environment configuration module which configures a service environment using the received user profile.

According to a further aspect of the present invention, there is provided a network device including a network interface module which receives user identification information from a control device, a control module which searches for a user profile corresponding to the received user identification information and transmits the user profile to the control device through the network interface module when the user profile is found, and a user profile management module which creates a new user profile corresponding to the user identification information if the user profile is not found.

BRIEF DESCRIPTION OF THE DRAWINGS

The above and other features of the present invention will become more apparent by describing in detail exemplary embodiments thereof with reference to the attached drawings in which:

FIG. 6 illustrates a user profile in a table form according to an exemplary embodiment of the present invention;

FIG. 12 is a flowchart illustrating a method for providing a user-adapted service environment according to another exemplary embodiment of the present invention.

DETAILED DESCRIPTION OF THE INVENTION

Figure 1:
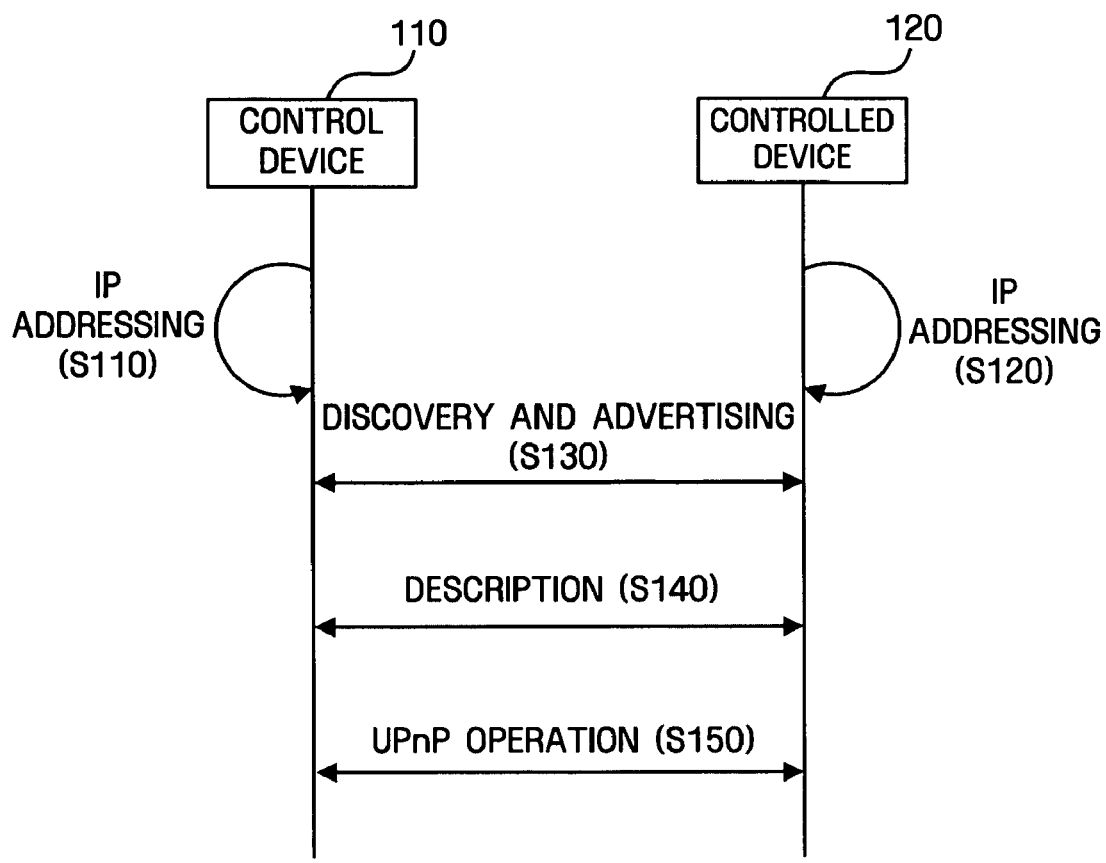
FIG. 1 is a flowchart illustrating an operation of a home network between a control device and a controlled device according to an exemplary embodiment of the present invention.

Features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will convey the concept of the invention to those skilled in the art, and the present invention will only be defined by the appended claims. Like reference numerals refer to like element throughout the specification.

Hereinafter, exemplary embodiments of the present invention will be described in detail with reference to the accompanying drawings.

In describing the present invention, a control device and a controlled device are network devices that provide a specific service to a user and are equipped with a function of storing or reproducing contents and capable of performing wired or wireless communication. Examples of the control device and the controlled device include home electronic devices such as a digital TV, a notebook computer, a personal digital assistant (PDA), a printer, or the like. The control device can control the controlled device according to user's request and the controlled device can provide a specific service according to the control of the control device.

More specifically, the control device and the controlled device are understood as a control point (CP) and a controlled device (CD) in UPnP, respectively. Thus, the control device and the controlled device described in the present invention are assumed to be connected in a local network environment using UPnP middleware. However, it will be understood by those of ordinary skill in the art that various types of dynamic mechanism middleware such as JINI, HAVI, and OSGi can be used.

Hereinafter, the present invention will be described based on a home network system as a representative example of a predetermined local network without being limited thereto. Also, it should be understood that a network system in another form including a control device and a controlled device of the type described below is also included in the scope of the present invention.

FIG. 1 is a flowchart illustrating an operation of a home network between a control device and a controlled device according to an exemplary embodiment of the present invention.

As illustrated in FIG. 1, since a UPnP network is based on a TCP/IP protocol, a control device 110 and a controlled device 120 to be connected to a home network undergo an IP addressing process in steps S110 and S120.

There are two types for the IP addressing process. The IP addressing process type is determined according to whether a Dynamic Host Configuration Protocol (hereinafter referred to as "DHCP") server is connected to the home network.

When the DHCP server is connected to the home network, the control device 110 and the controlled device 120 use an IP address assigned by the DHCP server. When there is no DHCP server available, the control device 110 and the controlled device 120 use "automatic IP" (Auto IP) in order to get an Internet address.

Once the control device 110 and the controlled device 120 are connected to the home network and appropriately addressed, a discovery and advertising process is performed in step S130.

Operation of the step S130 is classified as a discovery process in which a new control device is connected to the home network and searches and discovers for controlled devices operating on the home network, and advertising process in which a new controlled device is connected to the home network and advertises control devices operating on the home network of its existence.

In the discovery process, the CP 110 uses a Simple Service Discovery Protocol (SSDP) to confirm the controlled device 120 operating on the home network. At this time, the control device 110 multicasts a search message and the controlled device 120 that has received the search message unicasts a response message with respect to the search message to the control device 110. The control device 110 registers the controlled device 120 as a device to be controlled through the response message of the controlled device 120.

In the advertising process, the controlled device 120 multicasts an advertising message to advertise control devices in the home network of its existence. At this time, the control device 110 registers the controlled device 120 as a device to be controlled through the advertising message delivered from the controlled device 120.

After the control device 110 and the controlled device 120 confirm their existence through the discovery and advertising process, a description process is performed in step S140.

Through the description process, the control device 110 obtains more detailed information regarding functions of the controlled device 120. In the description process, the control device 110 requests from the controlled device 120 a device description file and a service description file. In response to the request of the control device 110, the controlled device 120 transmits the device description file and the service description file to the control device 110.

The device description file and the service description file are represented using a markup language such as eXtensible Markup Language (XML). The control device 110 can obtain detailed information about the controlled device 120 through the device description file and the service description file.

After the description process, a UPnP operation process is performed in step S150. The UPnP operation process is performed through a control operation, a confirming operation, a presentation operation, and so on.

In the control operation, the control device 110 transmits a service request command to the controlled device 120 using a Simple Object Access Protocol (SOAP). Here, controlled device 120 transmits a corresponding response message to the control device 110 and provides a specific service requested by the control device 110.

The confirming operation is an operation for confirming that a status of the controlled device 120 that has provided the specific service is changed according to the service request command transmitted from the control device 110. In the confirming operation, the control device 110 transmits a subscription request message to the controlled device 120 in order to confirm the status change. In order to for the controlled device 120 to inform the control device 110 of the status change, the controlled device 120 transmits an event message to the control device 110. The event message is formatted using a Generic Event Notification Architecture (GENA). The control device 110 receives the event message and updates status information corresponding to the controlled device 120.

In the presentation operation, the control device 110 can search a page through a Uniform Resource Locator (URL) for presentation and can load the page on its browser. A User can control the controlled device 120 using the page loaded on the browser of the control device 110 or inquire of a status of the controlled device 120 using the page.

Figure 2:
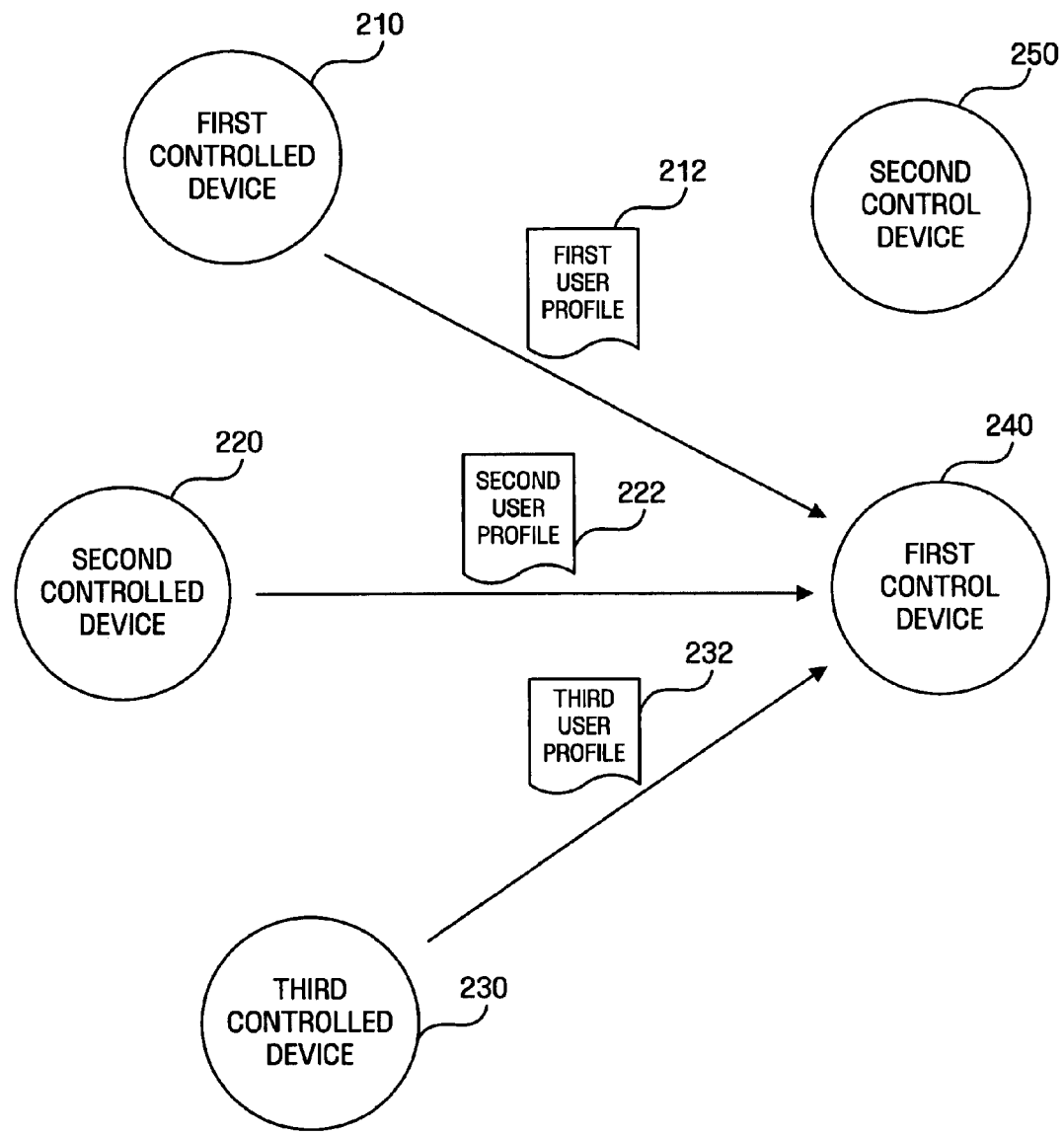
FIG. 2 illustrates a home network system according to an exemplary embodiment of the present invention.

FIG. 2 illustrates a home network system according to an exemplary embodiment of the present invention.

The home network system illustrated in FIG. 2 includes at least one first and second control devices 240 and 250 and first through third controlled devices 210, 220, and 230. In FIG. 2, a user controls the first through third controlled devices 210, 220, and 230 using the first control device 240.

The first through third controlled devices 210, 220, and 230 can store digital content (hereinafter, "content") such as moving pictures, audio files, documents, and Java games, and perform specific functions such as sleep reservation, alarm, and recording according to their characteristics. Thus, according to an exemplary embodiment of the present invention, a service of a controlled device includes a service for providing content stored in the controlled device and a service for providing a function according to its characteristics.

The first through third controlled devices 210, 220 and 230 store first through third user profiles 212, 222, and 232, respectively. The first through third user profiles 212, 222, and 232 include history information of services provided to a user from the first through third controlled devices 210, 220, and 230. The first through third user profiles 212, 222, and 232 will be described in detail later with reference to FIG. 6. When the user uses services of the first through third controlled devices 210, 220, and 230, the first through third controlled devices 210, 220, and 230 update the user's first through third user profiles 212, 222, and 232.

The first control device 240 used by the user authenticates the user through a predetermined authentication process and obtains the first through third user profiles 212, 222, and 232 of the authenticated user from the first through third controlled devices 210, 220, and 230. At this time, the first control device 240 provides an appropriate service environment to the user using history information included in the first through third user profiles 212, 222, and 232.

For example, the first control device 240 may confirm a service that has been used recently or is frequently used by the user using history information included in the first user profile 212 received from the first controlled device 210. Thus, when the user desires to search for services provided by the first controlled device 210 using the first control device 240, the first control device 240 may configure a user interface (UI) to display services that has been used recently or is frequency used by the user.

Hereinafter, a process of obtaining a user profile from a controlled device by a control device according to an exemplary embodiment of the present invention will be described with reference to FIG. 3.

Figure 3:
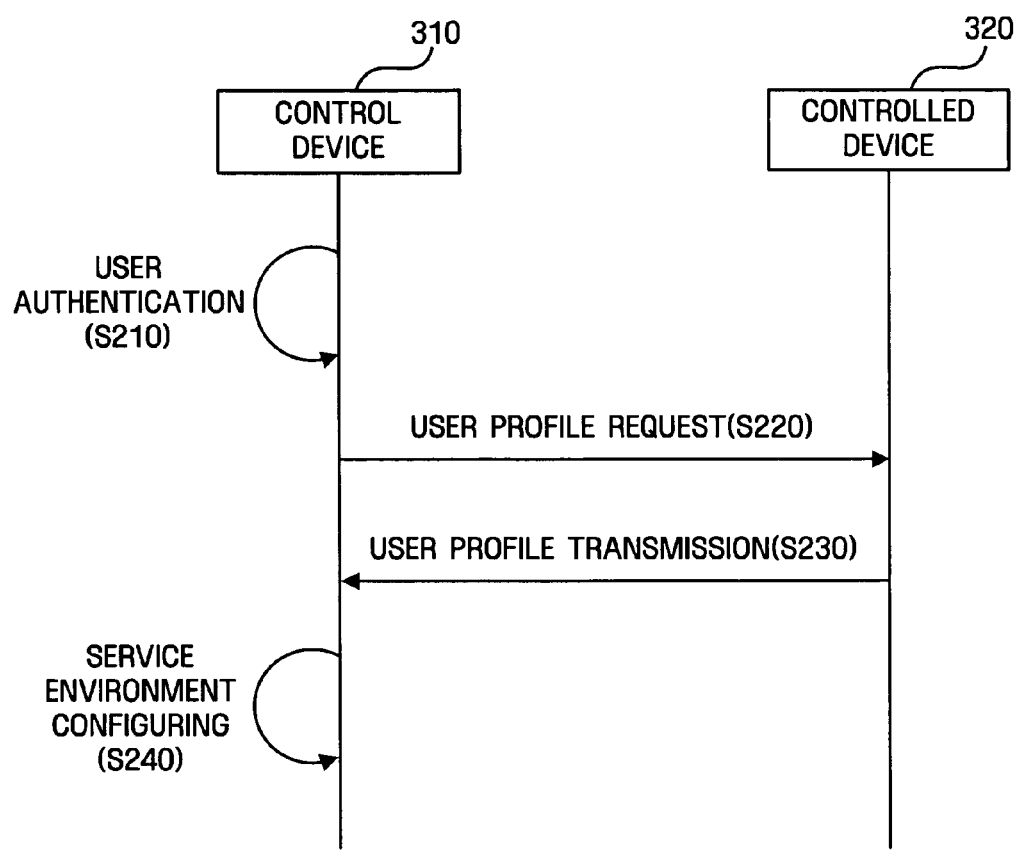
FIG. 3 is a flowchart illustrating a process of providing a user profile according to an exemplary embodiment of the present invention.

FIG. 3 is a flowchart illustrating a process of providing a user profile according to an exemplary embodiment of the present invention.

First, a control device 310 authenticates a user in step S210. Through user authentication, only an authorized user is allowed to use the control device 310 and a user who desires to use a service of a controlled device 320 using the control device 310 can be identified. User authentication may be performed via an ID and a password or via biometrics such as fingerprint identification or voice recognition. Thus, in user authentication, the user inputs authentication information such as a fingerprint, a voice signal, or an ID and a password to the control device 310 and the control device 310 authenticates the user through the authentication information input by the user.

After user authentication, the control device 310 requests a user profile of the authenticated user from the controlled device 320 in step S220. When requesting the user profile, the control device 310 may also transmit user identification information for identifying the authenticated user to the controlled device 320.

The controlled device 320 searches for a user profile corresponding to the user identification information transmitted together with a user profile request and transmits the searched user profile to the control device 310 in step S230. If the user profile corresponding to the user identification information received from the control device 310 is not found, the controlled device 320 may create a new user profile corresponding to the user identification information and transmit the created user profile to the control device 310. At this time, the created user profile may be set to a predefined default value.

The control device 310 receiving the user profile from the controlled device 320 configures a user-adapted service environment using information included in the user profile in step S240. For example, when the user desires to check for a list of contents stored in the controlled device 320, the control device 310 configures the list of contents stored in the controlled device 320 using history information included in the user profile in the order of time or frequency of use of the contents and displays the list to the user. Thus, the user can easily search for recently or frequently used content.

In the current embodiment of the present invention, the process of transmitting the request for the user profile (step S220) and the process of transmitting the user profile (step S230) can be performed simultaneously with the description process (step S140) of the operation of the home network described with reference to FIG. 1.

According to an exemplary embodiment of the present invention, the control device 310 may request a user profile along with a device description file and a service description file from the controlled device 320. In response to the request, the controlled device 320 may transmit the user profile along with the device description file and the service description file to the control device 310, but the present invention is not limited thereto. Steps S220 and S230 of FIG. 3 may also be performed through the UPnP operation process (step S150) of FIG. 1.

Figure 4:
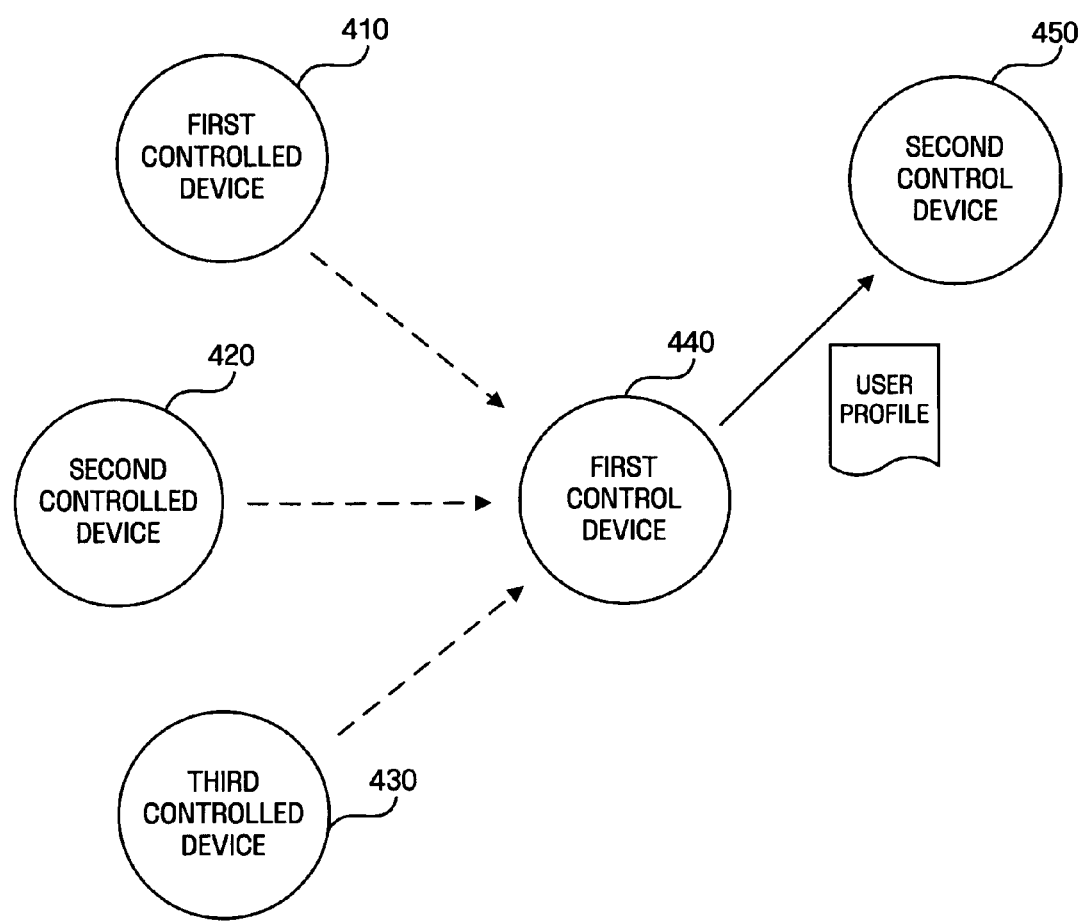
FIG. 4 illustrates a home network system according to another exemplary embodiment of the present invention.

FIG. 4 illustrates a home network system according to another exemplary embodiment of the present invention.

In the illustrative embodiment, the user using a first control device 440 also uses a second control device 450.

After a predetermined authentication process, if the user using services of first through third controlled devices 410, 420, and 430 through the first control device 440 inputs authentication information to the second control device 450, the second control device 450 authenticates the user using the input authentication information and requests a user profile of the authenticated user from the first control device 440. At this time, the second control device 450 may also transmit user identification information for identifying the authenticated user together with a user profile request to the first control device 440.

The first control device 440 transmits a user profile obtained from the controlled devices 410, 420, and 430 to the second control device 450 at the request of the second control device 450.

The second control device 450 configures a service environment using the user profile received from the first control device 440.

If the second control device 450 fails to receive the user profile from the first control device 440, the second control device 450 requests the user profile from the first through third controlled devices 410, 420, and 430 as described with reference to FIGS. 2 and 3.

Hereinafter, a control device and a controlled device according to an exemplary embodiment of the present invention will be described in more detail.

Figure 5:
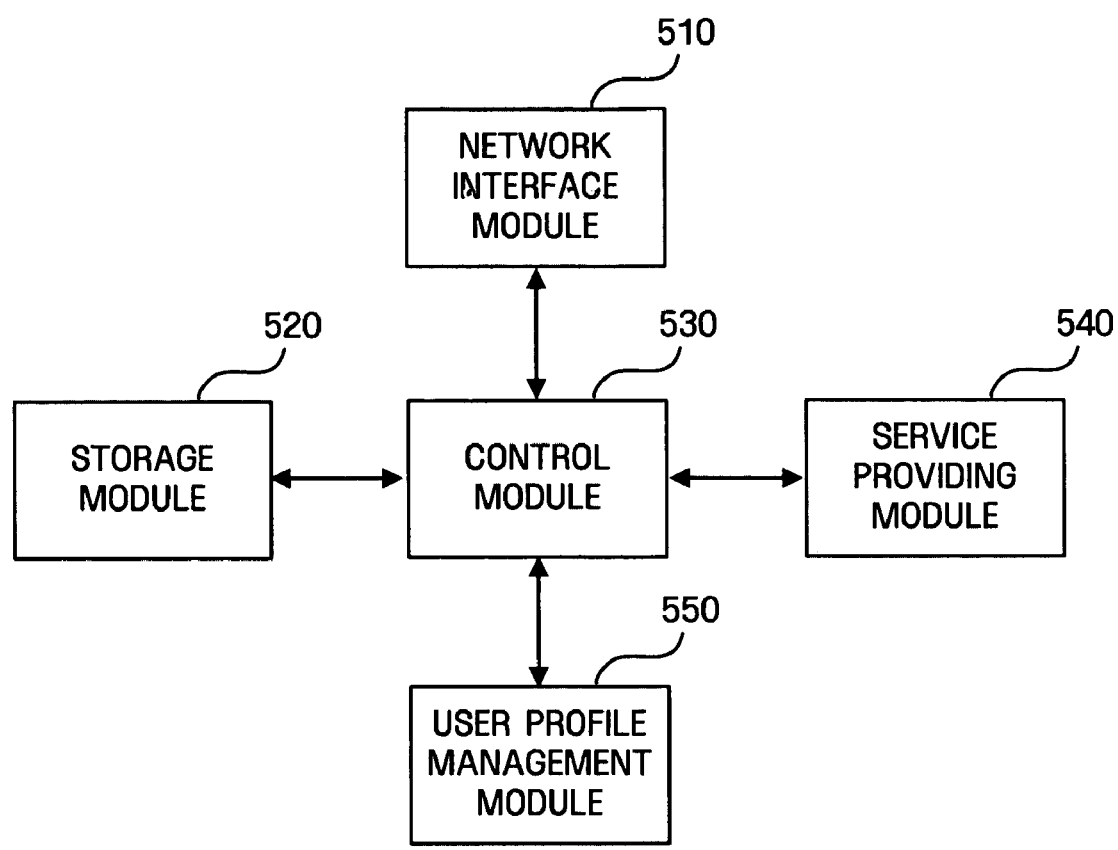
FIG. 5 is a block diagram of a controlled device according to an exemplary embodiment of the present invention.

FIG. 5 is a block diagram of a controlled device according to an exemplary embodiment of the present invention.

The controlled device includes a network interface module 510, a storage module 520, a control module 530, a service providing module 540, and a user profile management module 550.

The network interface module 510 performs communication with other network devices using a wired or wireless medium.

The storage module 520 stores content such as moving pictures, audio files, documents, or Java games. The storage module 520 also stores a user profile managed by the user profile management module 550.

The control module 530 controls operations of functional blocks 510, 520, 540, and 550 of the controlled device and controls the operations of a home network of the type described with reference to FIG. 1. Thus, the control module 530 forms a predetermined session with a control device connected using the wired or wireless medium through the network interface module 510 and a process of forming the predetermined session can be the IP addressing process (step S120) and the discovery and advertising process (step S130) described with reference to FIG. 1.

The control module 530 also searches in the storage module 520 for a user profile corresponding to user identification information received together with a user profile request from a control device. Once the user profile is found, the control module 530 transmits the found user profile to the control device through the network interface module 510.

However, if the user profile corresponding to the user identification information is not found, the control module 530 controls the user profile management module 550 to create a new user profile and transmit the created user profile to the control device through the network interface module 510.

The service providing module 540 provides a service requested by the user through the control device. According to an exemplary embodiment of the present invention, the service providing module 540 may transmit content stored in the storage module 520 to the control device through the network interface module 510. At this time, the content may be transmitted through streaming or downloading. According to another exemplary embodiment of the present invention, the service providing module 540 may perform a specific function such as sleep reservation, alarm, and recording according to the characteristics of the controlled device.

The user profile management module 550 creates a new user profile according to the control of the control module 530. An initially created user profile corresponding to user identification information may be set to a predefined default value.

In addition, the user profile management module 550 also updates the user profile when the user is provided with a service from the controlled device through the control device.

The user profile according to an exemplary embodiment of the present invention includes history information about the use of a service by the user. The user profile may further include environment values for using a device, set by the user using the service, and information about a basic layout of a UI provided to the user.

The user profile according an exemplary embodiment of the present invention is illustrated in the form of a table in FIG. 6.

The user profile illustrated in FIG. 6 includes user identification information 610, basic UI type information 620, history information 630, and use environment setting information 640.

The user identification information 610 is used to identify a user to which the user profile is applied.

The basic UI type information 620 is used to designate a basic layout of a UI to be created when a control device displays a list of services provided by a controlled device. Thus, the UI created by the control device to provide a list of services provided by the controlled device to the user may be expressed in a thumbnail form, a tree structure, or a table structure according to basic UI type information included in the user profile. In the current embodiment of the present invention, since the basic UI type information 620 is a tree structure, a control device receiving the user profile illustrated in FIG. 6 from the controlled device creates a tree-structured UI when configuring a list of services provided by the controlled device in the UI. If the user changes a basic layout of the UI provided by the control device, the user profile management module 550 updates the basic UI type information 620 to designate the changed layout.

The history information 630 indicates a history about the use of services of the controlled device by the user identified through the user identification information 610. The user's use of a service of the controlled device may be divided into the use of content stored in the controlled device and the use of a function of the controlled device such as sleep reservation, recording, or alarm. The history information 630 may include history information 632 about content and history information 634 about the function of the controlled device as illustrated in FIG. 6.

The history information 630 includes the times of use of the services (i.e., contents stored in the controlled device and the function of the controlled device) that can be provided by the controlled device, the usage duration of the services, and a recent date of use of the services. Thus, the control device may configure a UI using the history information 630 included in the user profile such that the UI displays a service that is recently or frequently used by the user.

If the user is provided with a service from the controlled device, the history information 630 is updated by the user profile management module 550.

The use environment setting information 640 indicates device use environment values that are previously set by the user at the time of using a service. For example, the use environment setting information 640 may include information such as screen brightness, screen aspect ratio, or volume that is previously set by the user when the user reproduces a movie file stored in the controlled device. The control device can automatically set the user's preferred device use environment values by using the use environment setting information 640. If the user changes a device use environment value through the control device, the user profile management module 550 updates the use environment setting information 640.

Figure 7:
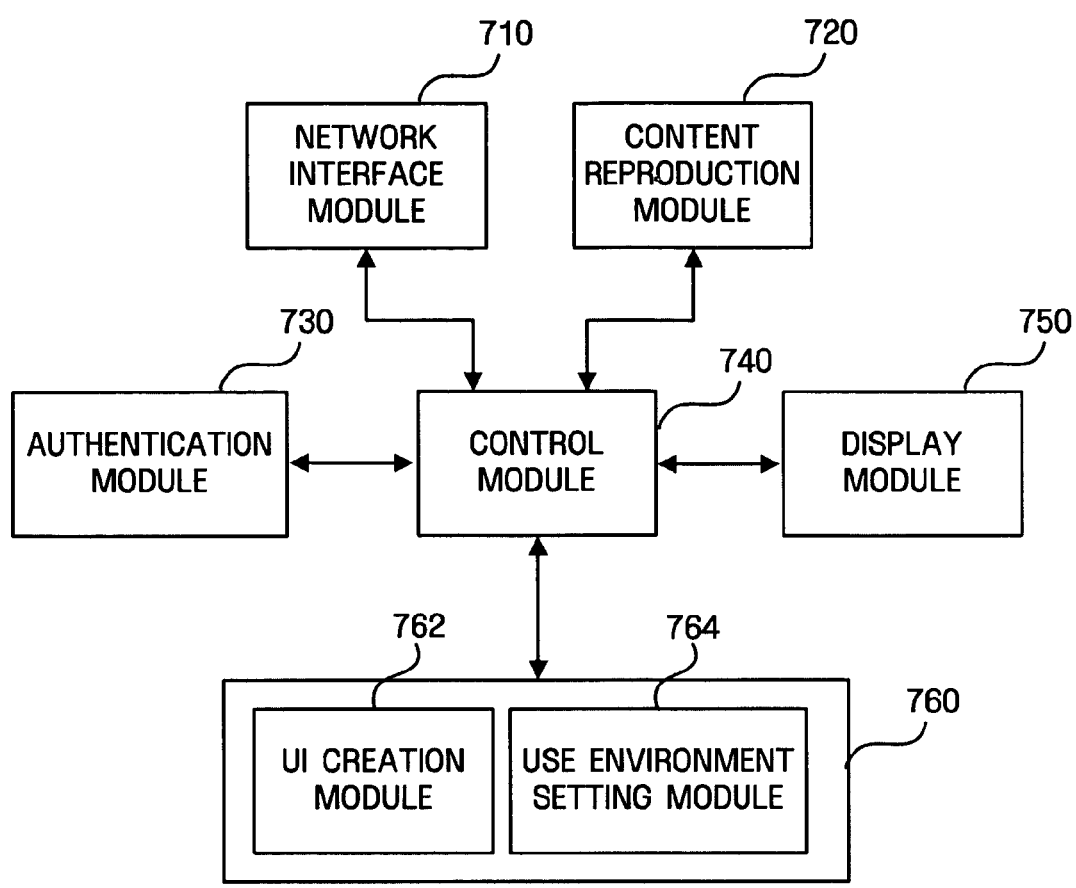
FIG. 7 is a block diagram of a control device according to an exemplary embodiment of the present invention.

FIG. 7 is a block diagram of a control device according to an exemplary embodiment of the present invention.

Referring to FIG. 7, the control device includes a network interface module 710, a content reproduction module 720, an authentication module 730, a control module 740, a display module 750, and a service environment configuration module 760.

The network interface module 710 communicates with a controlled device through a wired or wireless communication medium.

The content reproduction module 720 reproduces content downloaded or streamed from a controlled device. For example, the content reproduction module 720 can reproduce a moving picture file by performing an MPEG decoder function.

The authentication module 730 receives predetermined user authentication information from a user and authenticates the user through the received user authentication information. The user authentication information may be text information such as an ID and a password. The authentication module 730 may thus have an input means such as a keypad, a touch pad, or a touch screen, but the present invention is not limited to only these types of input devices. The authentication module 730 may also authenticate the user using biometrics such as fingerprint identification or voice recognition.

The control module 740 controls operations of functional blocks 710 through 730, 750, and 760 of the control device. The control module 740 controls the operations of a home network described with reference to FIG. 1. The control module 740 forms a predetermined session with the controlled device connected using the wired or wireless communication medium through the network interface module 710. The process of forming the predetermined session can be understood as the IP addressing process (step S110) and the discovery and advertising process (step S130) described with reference to FIG. 1.

The control module 740 requests a user profile of the user authenticated by the authentication module 730 from the controlled device. At this time, the control module 740 transmits user identification information for identifying the authenticated user to the controlled device using the network interface module 710.

According to another exemplary embodiment of the present invention, the control module 740 may request a user profile from another control device existing in a home network. In this case, if the user profile is not transmitted from the other control device, the control module 740 requests the user profile from the controlled device as described above.

If a specific user is authenticated by the authentication module 730, user profiles of the authenticated user are received from controlled devices, and user identification information for identifying the authenticated user, along with a user profile request, is received from another control device, the control module 740 transmits the user profiles received from the controlled devices to the other control device through the network interface module 710.

The control module 740 may request a service from a controlled device at the request of the user and transmit information required for updating a user profile to the controlled device through the network interface module. For example, if the user changes a layout of a UI created by a UI creation module 762, the control module 740 may transmit information about the changed layout to the controlled device through the network interface module 710. Thus, the user profile management module 550 of the controlled device may change basic UI type information included in a user profile.

The display module 750 displays a UI created by the UI creation module 762. The display module 750 also displays content reproduced by the content reproduction module 720.

The service environment configuration module 760 configures a service environment adapted to the user authenticated by the authentication module 730, using a user profile received from a controlled device or another control device. At this time, the service environment configuration module 760 creates a UI that facilitates a search for a user's recently or frequently used service and sets a user's preferred device use environment value. To this end, the service environment configuration module 760 includes the UI creation module 762 and a use environment setting module 764.

The UI creation module 762 creates a UI which displays a list of services provided by a controlled device. At this time, the UI creation module 762 configures a list of services using history information included in the user profile. Thus, the UI creation module 762 may configure a list of services such that a user's recently or frequently used service is displayed. For example, when a list of services is configured based on times of use, a service that is more frequently used may be positioned at an upper level of the list displayed by the UI. If the list of services is configured based on recent date of use, a service that has been used recently may be positioned at an upper level of the list. The initial configuration of the list can be previously set by the user. The UI creation module 762 may create a UI which displays a user's recently or frequently used service on a separate display area. Thus, the user can more easily search for the recently or frequently used service (i.e., content stored in a controlled device or the function of the controlled device).

When a plurality of controlled devices exists in a home network and a plurality of user profiles of a single user is received, the UI creation module 762 may configure a list of services for each controlled device.

In addition, the UI creation module 762 creates a UI having a layout designated by basic UI type information included in a user profile. For example, if the basic UI type information is a tree structure, the UI creation module 762 creates a UI having a tree structure.

The use environment setting module 764 sets a device use environment value according to use environment setting information included in the user's profile. Thus, a device use environment value that is previously set by a user according to a user's preference can be applied to the same user later.

In the description of FIGS. 5 and 7, the term "module", as used herein, means, but is not limited to, a software or hardware component, such as a Field Programmable Gate, Array (FPGA) or Application Specific Integrated Circuit (ASIC), which performs certain tasks. A module may advantageously be configured to reside on the addressable storage medium and configured to execute on one or more processors. Thus, a module may include, for example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute on one or more computers in a communication system.

Hereinafter, operations of a control device and a controlled device will be described in more detail with reference to FIGS. 8 through 11.

Figure 8:
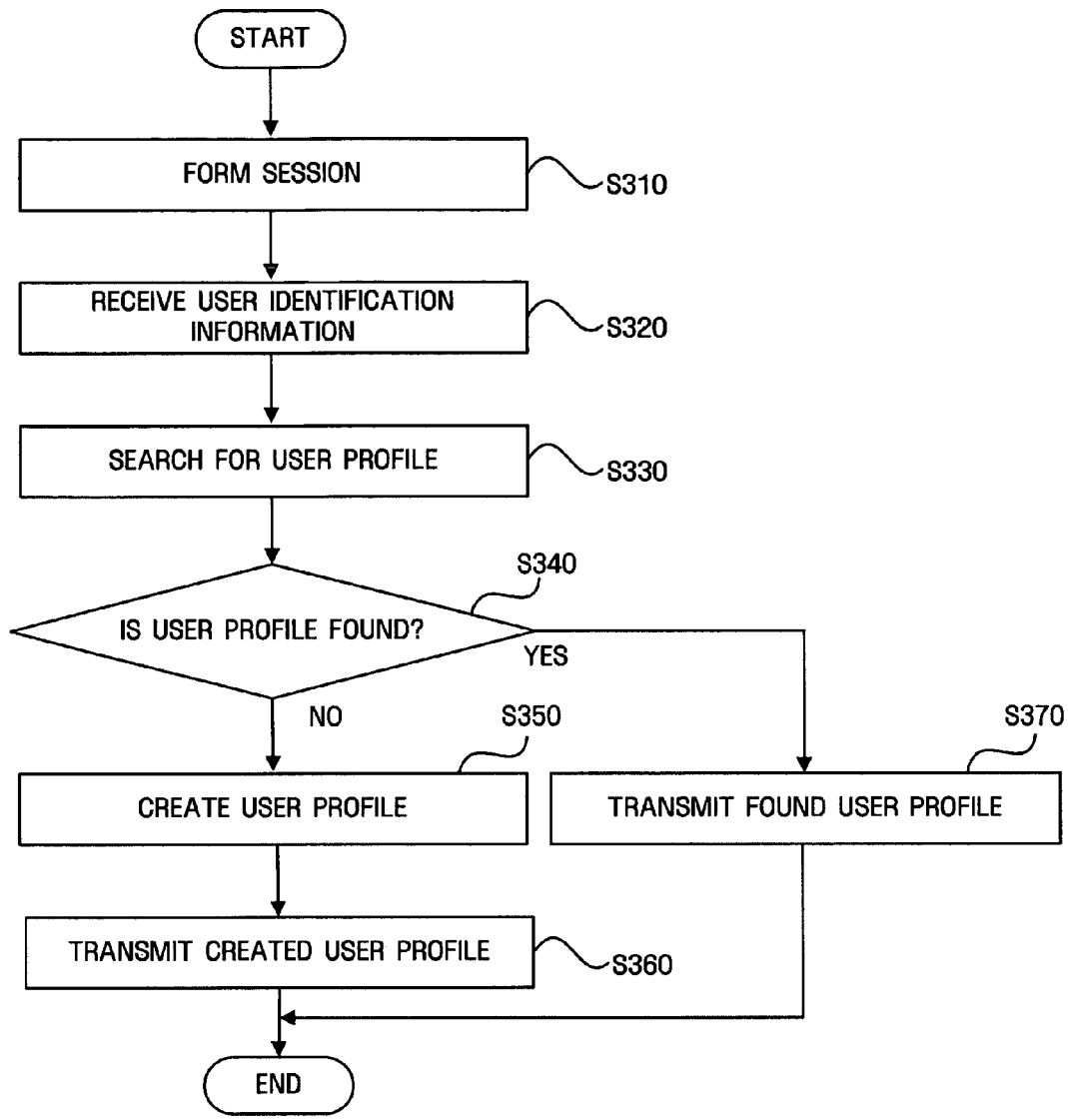
FIG. 8 is a flowchart illustrating a method for providing a user-adapted service environment in a controlled device according to an exemplary embodiment of the present invention.

FIG. 8 is a flowchart illustrating a method for providing a user-adapted service environment in a controlled device according to an exemplary embodiment of the present invention.

To connect to a home network, the control module 530 of a controlled device forms a session with control devices in the home network through the network interface module 510 in step S310. The process of forming the session can be the IP addressing process (step S120) and the discovery and advertising process (step S130) described with reference to FIG. 1.

If the network interface module 150 receives user identification information together with a user profile request from the control device in step S320, the control module 530 searches for a user profile corresponding to the user identification information in the storage module 520 in step S330.

The control module 530 determines whether the user profile is found in step S340. If the user profile is found, the network interface module 510 transmits the found user profile to the control device in step S370.

However, if the user profile is not found, the user profile management module 550 creates a user profile corresponding to the user identification information in step S350.

At this time, the network interface module 510 transmits the user profile created by the user profile management module 550 to the control device in step S360.

If a service is provided to the user to which the user profile is applied after the user profile is transmitted to the control device, the controlled device updates the user profile of the user as follows.

Figure 9:
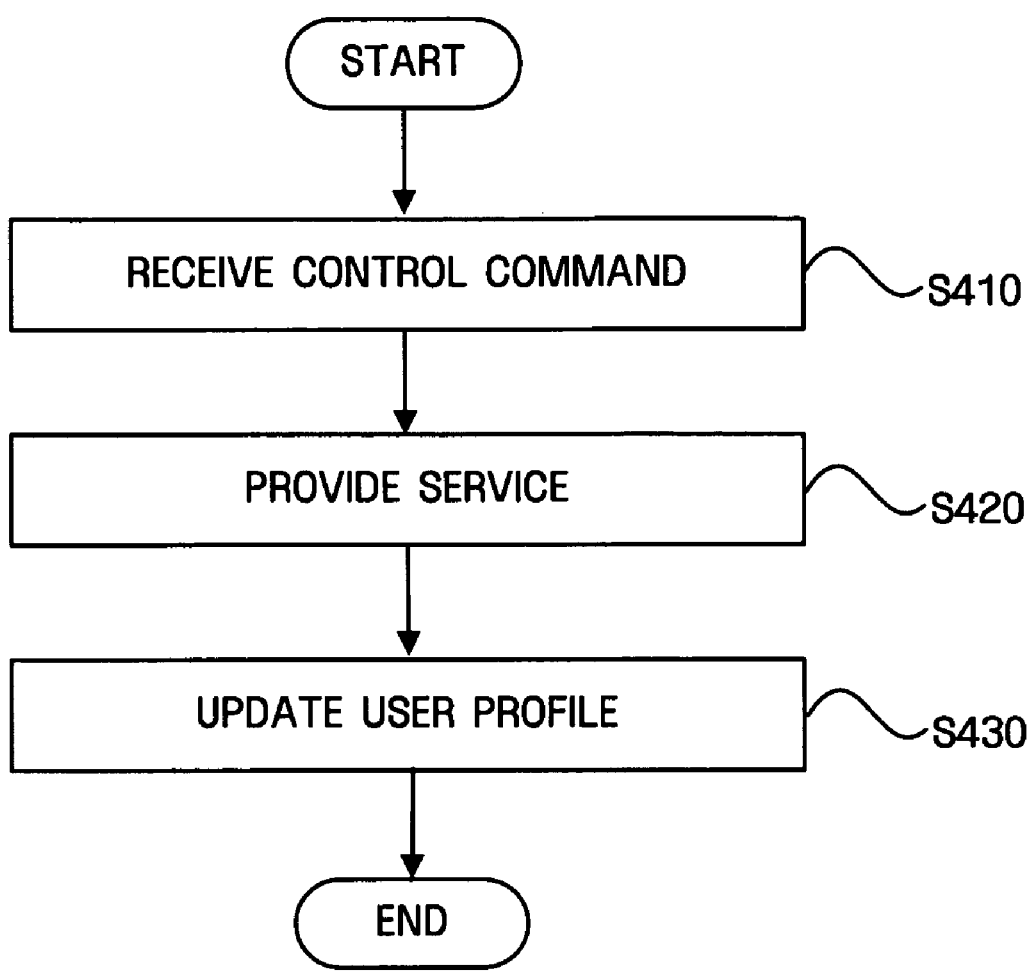
FIG. 9 is a flowchart illustrating a process of updating a user profile according to an exemplary embodiment of the present invention.

FIG. 9 is a flowchart illustrating a process of updating a user profile according to an exemplary embodiment of the present invention.

Once the network interface module 510 receives the control command for providing a specific service from a control device in step S410, the service providing module 540 provides a service according to the received control command in step S420. The process of providing a service can be understood as providing content stored in the storage module 510 or performing a function according to device characteristics.

At this time, the user profile management module 550 updates a user profile according to a service provided to the user in step S430. For example, if the user uses specific content, the user profile management module 550 updates times of use, usage duration, and recent date of use of the content used by the user in the user profile of the user.

Figure 10:
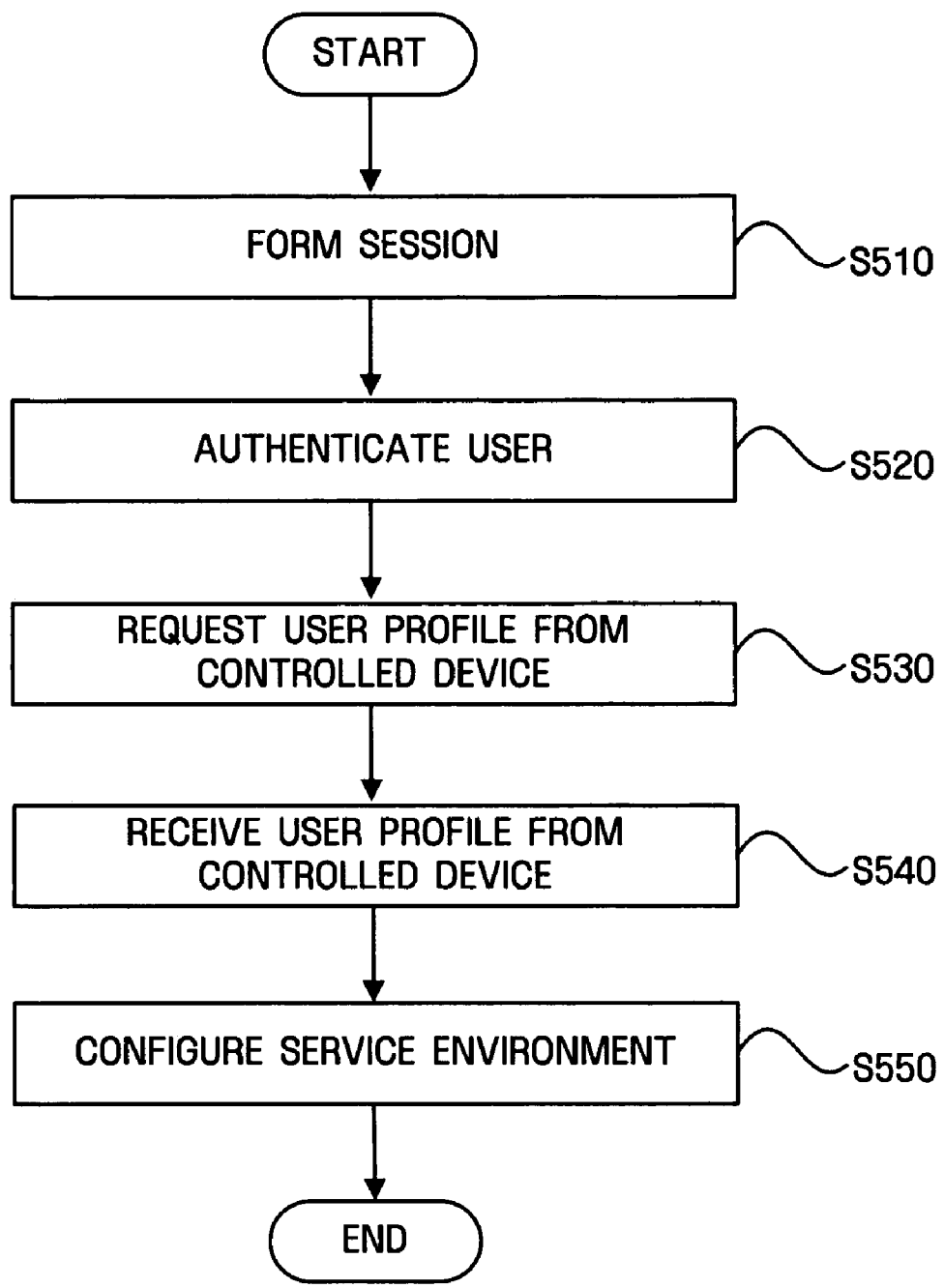
FIG. 10 is a flowchart illustrating a method for providing a user-adapted service environment in a control device according to an exemplary embodiment of the present invention.

FIG. 10 is a flowchart illustrating a method for providing a user-adapted service environment in a control device according to an exemplary embodiment of the present invention.

To connect to a home network, the control module 740 of the control device forms a session with controlled devices in the home network through the network interface module 710 in step S510. The process of forming the session can be the IP addressing process (step S110) and the discovery and advertising process (step S130) described with reference to FIG. 1.

The authentication module 730 authenticates the user using authentication information input by the user in step S520. Although the process of authenticating the user (step S520) is performed after the process of forming the session (step S510) in the current embodiment of the present invention, the process of authenticating the user (step S520) may be performed prior to the process of forming the session (step S510).

After completion of the session formation process and the user authentication process, the control module 740 requests a user profile from the controlled device through the network interface module 710 in step S530. The control module 740 may then also transmit user identification information corresponding to an authenticated user.

Once the network interface module 710 receives the user profile from the controlled device in step S540, the service environment configuration module 760 configures a service environment adapted to the user using the user profile in step S550. The process of configuring a service environment (step S550) may include a process of configuring a UI providing a list of services of the controlled device at the UI creation module 762 using basic UI type information and history information included in the user profile. The process of configuring a service environment (step S550) may include setting an device use environment value in the use environment setting module 764 using environment setting information included in the user profile when the content reproduction module 720 reproduces content stored in the controlled device.

If a user profile is requested from another control device after step S540, the control module 740 may transmit the user profile received from the controlled device to the other control device as follows.

Figure 11:
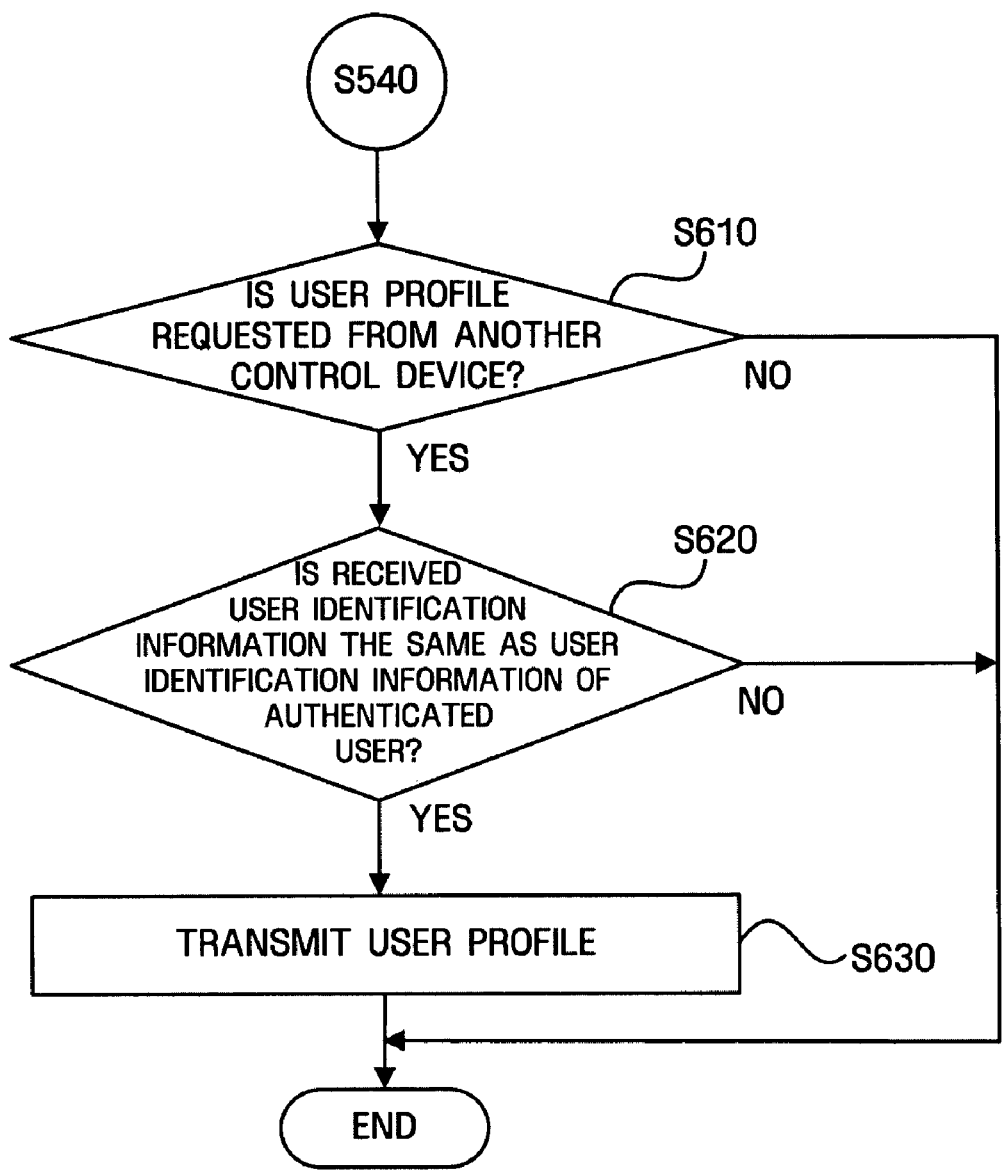
FIG. 11 is a flowchart illustrating a process of transmitting a user profile from a control device to another control device in a method for providing a user-adapted service environment in a controlled device according to an exemplary embodiment of the present invention.

FIG. 11 is a flowchart illustrating a process of transmitting a user profile from a control device to another control device according to an exemplary embodiment of the present invention.

As illustrated in FIG. 11, if the network interface module 710 receives a user profile request from another control device in step S610 after the user profile is received from the controlled device, the control module 740 determines whether user identification information received along with the user profile request is the same as user identification information of the user authenticated in step S520 in step S620.

If the received user identification information is the same as the user identification information of the authenticated user, the network interface module 710 transmits the user profile received from the controlled device to the other control device in step S630.

FIG. 12 is a flowchart illustrating a method for providing a user-adapted service environment according another exemplary embodiment of the present invention.

The control module 740 forms a session for connecting to a home network in step S710 and the authentication module 730 authenticates the user in step S720.

The control module 740 requests a user profile from another control device connected to the home network through the network interface module 710 in step S730. The control module 740 may then also transmit user identification information for identifying the authenticated user.

Once the network interface module 710 receives a user profile from another control device in step S740, the service environment configuration module 760 configures a service environment adapted to the user using the received user profile in step S770.

However, if the user profile is not received from another control device, the control module 740 requests a user profile from a controlled device connected to the home network in step S750. The control module 740 may then also transmit user identification information for identifying the authenticated user through the network interface module 710.

Upon receiving the user profile from the controlled device in step S760, the service environment configuration module 760 configures a service environment adapted to the user using the user profile in step S770.

According to the present invention, as described above, a user-adapted service environment can be provided.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and are not intended to be limiting.

What is claimed is:

1. A method for providing a user-adapted service environment, the method comprising:
   authenticating a user;
   transmitting first user identification information for identifying the authenticated user from a control device to a first controlled device and a second controlled device;
   receiving a first user profile corresponding to the first user identification information from the first controlled device and receiving a second user profile corresponding to the first user identification information from the second controlled device; and
   the control device configuring a service environment using the received first user profile and the received second user profile;
   wherein the first user profile comprises first history information including a history of a service provided to the authenticated user from the first controlled device, and the second user profile comprises second history information including a history of service provided to the authenticated user from the second controlled device.

2. The method of claim 1, wherein the first history information comprises at least one of times of use, usage duration, and a recent date of use of the authenticated user for each service provided by the first controlled device, and the second history information comprises at least one of times of use, usage duration, and a recent date of use of the authenticated user for each service provided by the second controlled device.

3. A method for providing a user-adapted service environment, the method comprising:
   authenticating a user;
   transmitting first user identification information for identifying the authenticated user to a controlled device;
   receiving a first user profile corresponding to the first user identification information from the controlled device; and
   configuring a service environment using the received first user profile;
   wherein the first user profile comprises history information including a history of a service provided to the authenticated user from the controlled device;
   wherein the configuring comprises creating a UI displaying a list of services provided by the controlled device according to the history information.

4. The method of claim 3, wherein the layout of the UI is set by the basic UI type information.

5. The method of claim 1, wherein at least one of the first user profile and the second user profile comprises use environment setting information indicating a device use environment value set by the authenticated user when the authenticated user uses the services provided by the associated controlled device, and the configuring comprises configuring the service environment according to the use environment setting information.

6. The method of claim 1, wherein the control device is a first control device, further comprising:
   the first control device receiving second user identification information from a second control device; and
   the first control device transmitting at least one of the first user profile and the second user profile to the second control device when the second user identification information is the same as the first user identification information.

7. The method of claim 1, wherein the control device is a first control device, further comprising:
   transmitting the first user identification information to a second control device; and
   the first control device configuring the service environment according to a user profile received from the second control device when the user profile corresponding to the first user identification information is received from the second control device,
   wherein the transmitting of the first user identification information from the first control device to the first controlled device and the second controlled device is performed when no user profile is received from the second control device.

8. A method for providing a user-adapted service environment, the method comprising:
   at a first controlled device and a second controlled device, receiving user identification information from a control device;
   at each of the first controlled device and the second controlled device, searching for a user profile corresponding to the received user identification information;
   at each of the first controlled device and the second controlled device, transmitting the user profile to the control device when the user profile is found; and
   at each of the first controlled device and the second controlled device, creating a new user profile corresponding to the user identification information if the user profile is not found and transmitting the new user profile to the control device.

9. The method of claim 8, wherein the user profile comprises at least one of history information including a history of a service provided to the authenticated user from the controlled device, use environment setting information indicating a device use environment value set by the authenticated user when the authenticated user uses the service provided by the associated controlled device, and basic user interface (UI) type information designating a layout of a UI.

10. The method of claim 9, wherein the history information comprises at least one of times of use, usage duration, and the recent date of use of the authenticated user for each service provided by the associated controlled device.

11. The method of claim 8, further comprising, at at least one of the first controlled device and the second controlled device:

receiving a request for a predetermined service from the control device;

providing the requested service; and updating the user profile of a user using the service through the control device when the service is provided.

12. A network device comprising:

an authentication module which authenticates a user;

a network interface module which transmits first user identification information for identifying the authenticated user to a first controlled device and a second controlled device and receives a first user profile corresponding to the first user identification information from the first controlled device and receives a second user profile corresponding to the first user identification information from the second controlled device; and a service environment configuration module which configures a service environment according to the received first user profile and the received second user profile;

wherein the first user profile comprises first history information including a history of a service provided to the authenticated user from the first controlled device, and the second user profile comprises second history information including a history of service provided to the authenticated user from the second controlled device.

13. The network device of claim 12, wherein the first history information comprises at least one of times of use, usage duration, and the recent date of use of the authenticated user for each service provided by the first controlled device, and the second history information comprises at least one of times of use, usage duration, and a recent date of use of the authenticated user for each service provided by the second controlled device.

14. A network device comprising:

an authentication module which authenticates a user;

a network interface module which transmits first user identification information for identifying the authenticated user to a controlled device and receives a first user profile corresponding to the first user identification information from the controlled device; and a service environment configuration module which configures a service environment according to the received first user profile;

wherein the first user profile comprises history information including a history of a service provided to the authenticated user from the controlled device;

wherein the service environment configuration module comprises a UI creation module which creates a UI which displays a list of service provided by the controlled device according to the history information.

15. The network device of claim 14, wherein the layout of the user interface is set by the basic user interface type information.

16. The network device of claim 12, wherein at least one of the first user profile and the second user profile comprises use environment setting information indicating a device use environment value set by the authenticated user when the authenticated user uses the services provided by the associated controlled device, and the service environment configuration module comprises a use environment setting module which configures the service environment according to the use environment setting information.

17. The network device of claim 12, wherein the network device is a first control device, the first control device further comprising;

a control module which determines whether second user identification information received from a second control device through the network interface module is the same as the first user identification information and transmits the first user profile to the second control device through the network interface module if the second user identification information is the same as the first user identification information.

18. The network device of claim 12, wherein the network device is a first control device, the first control device further comprising;

a control module which transmits the first user identification information to a second control device through the network interface module and configures the service environment according to a user profile received from the second control device, when the user profile corresponding to the first user identification information is received from the second control device; and wherein the network interface module transmits the first user identification information to the first controlled device and the second controlled device if no user profile is received from the second control device.

* * * * *